(12) United States Patent
King et al.

(10) Patent No.: US 6,644,588 B2
(45) Date of Patent: Nov. 11, 2003

(54) MULTI-MODE TILTROTOR NACELLE CONTROL SYSTEM WITH INTEGRATED ENVELOPE PROTECTION

(75) Inventors: David W. King, Southlake, TX (US); Peter M. Shultz, Fort Worth, TX (US)

(73) Assignee: Bell Helicopter Textron, Inc., Forth Worth, TX (US)

( * ) Notice: Subject to any disclaimer, the term of this patent is extended or adjusted under 35 U.S.C. 154(b) by 0 days.

(21) Appl. No.: 10/130,646

(22) PCT Filed: May 16, 2001

(86) PCT No.: PCT/US01/15719

§ 371 (c)(1),
(2), (4) Date: May 17, 2002

(87) PCT Pub. No.: WO01/87706

PCT Pub. Date: Nov. 22, 2001

(65) Prior Publication Data

US 2002/0153452 A1 Oct. 24, 2002

Related U.S. Application Data

(60) Provisional application No. 60/204,499, filed on May 16, 2000.

(51) Int. Cl.$^7$ .............................................. B64C 29/00

(52) U.S. Cl. ........................... 244/7 A; 244/6; 244/7 R; 244/53 R; 244/54; 244/56

(58) Field of Search ................................. 244/3.1, 3.11, 244/6, 7 R, 7 A, 7 B, 7 C, 8, 17.11, 17.13, 17.15, 17.17, 17.19, 17.21, 17.23, 17.25, 17.27, 53 R, 54, 56, 62, 65, 66, 2

(56) References Cited

U.S. PATENT DOCUMENTS

| | | | | | |
|---|---|---|---|---|---|
| 3,404,852 | A | * | 10/1968 | Sambell et al. | 244/7 A |
| 3,797,783 | A | * | 3/1974 | Kisovec | 244/7 A |
| 4,979,698 | A | * | 12/1990 | Lederman | 244/7 R |
| 5,000,398 | A | * | 3/1991 | Rashev | 244/2 |
| 5,054,716 | A | * | 10/1991 | Wilson | 244/56 |

* cited by examiner

*Primary Examiner*—Bernarr E. Gregory
(74) *Attorney, Agent, or Firm*—James E. Walton

(57) ABSTRACT

A tiltrotor aircraft (11) has a multi-mode tiltrotor nacelle control system with integrated envelope protection (13). The tiltrotor aircraft (11) has a fuselage (15), a tail section (17), a left wing member (21a), a right wing member (21b), a right engine nacelle (23b), a left engine nacelle (23a), a left proprotor (25a), and a right proprotor (25b). Activation of the nacelle control system causes preselected rotational movement of the tiltrotor assembly.

20 Claims, 6 Drawing Sheets

| INPUTS | |
|---|---|
| NAME | DESCRIPTION |
| NACELLE_CLAWS_DATA<br>- NACELLE_ANGLE<br>- NACELLE_CLAWS_HOLD<br>- NACELLE_CLAWS_IC | DATA SENT TO CONTROL LAWS<br>NACANG<br>NACMDHD<br>NACMDIC |
| SELECTED_NACELLE_SIGNALS<br><br><br>- SELECTED_NACELLE_SIGNAL_FORWARD<br>- SELECTED_NACELLE_SIGNAL_AFT<br>- SELECTED_NACELLE_SIGNAL_EMERGENCY | FORWARD, AFT OR EMERGENCY RECONVERT NACELL CONVERSION COMMAND TRANSMITTED TO CLAWS<br>LPINCFWD<br>LPINCAFT<br>LPINCERC |
| NACELLE_FLIGHT_DATA<br>- CROSS_CHANNEL_IC_NACELLE_FORWARD<br>- CROSS_CHANNEL_IC_VALID<br>- CROSS_CHANNEL_IC_NACELLE_AFT<br>- CROSS_CHANNEL_IC_NACELLE_AFT_VALID<br>-<br>CROSS_CHANNEL_IC_EMERGENCY_COMMAND<br>- ANY_TWO_WEIGHT_ON_WHEELS<br>- AIRPLANE_MODE_RPM_LOGIC<br>- CLAWS_INITIALIZATION_DISCRETE<br>- CONTROL_LAW_AIRSPEED<br>- RPM_FAIL_DETECT_ENABLE<br>- DIRECT_MODE | XC_IC_GOFWD<br>XC_IC_VLD<br>XC_IC_GOAFT<br>XC_IC_GOAFT_VAL<br>XC_IC_ERCM<br><br>CLL01_ANY2WOW<br>CLC02_RPMLO<br>CLAW_INIT<br>CLW01_PCAS<br>RPM_FDE<br>CLL02_DIRECT |
| ENGINE_DATA<br>- ENGINE_POWER_OFF | LPOWOFF |
| FTI_SIGNALS<br>-<br>SELECTED_CONVERSION_PROTECTION_ENGAGE | DATA SENT TO CONTROL LAWS<br>FTIP_CP_SW_H |

*FIG. 8*

| OUTPUTS | |
|---|---|
| SWRD NAME | CLAW NAME/DESCRIPTION |
| CLAWS_HPDU_UNLOCK_COMMAND | CONTROL LAWS INITIATED CONVERSION OFF DOWNSTOP |
| CLAWS_NACELLE_ANGLE_DESIRED_POSITION | THE COMMANDED ANGLE AS CALCULATED BY THE CONTROL LAWS |
| CLAWS_NACELLE_AVIONICS_DATA<br>- MAXIMUM_CONVERSION_AIRSPEED_VCON<br>- MINIMUM_CONVERSION_AIRSPEED | NACELLE DISPLAY DATA<br>CLN04_VCON<br>CLN04_VMIN |
| CONVERSION_THRUST_DATA<br>-<br>CLAWS_NACELLE_ANGLE_DESIRED_POSITION<br>- EMERGENCY_RECONVERSION_MODE_LOGIC<br>- DISABLE_GOTO_DETENT_AFT<br>- NACELLE_ARIVED_AT_DETENT<br>- NACELLE_NOT_AT_FORWARD_DETENT<br>- NACELLE_GOTO_FORWARD_DETENT<br>- NACELLE_GOTO_AFT_DETENT<br>- NACELLE_RATE_COMMAND | CONVERSION DATA USED IN THE THRUST CONTROL LAWS<br>CLN03_NACMD<br><br>CLN01_ERCM<br>CLN01_DSAFT<br>CLN03_NAADT<br>CLN05_ES_FWD<br>CLN05_GOFWD<br>CLN05_GOAFT<br>CLN03_NACRATE |
| - NACELLE_NOT_AT_AFT_DETENT | CLN05_ES_AFT |

MULTI-MODE TILTROTOR NACELLE CONTROL SYSTEM WITH INTEGRATED ENVELOPE PROTECTION

This Appl. is a 371 of PCT/U.S. 01/15719 filed May 16, 2000, which claims benefit of Prov. No. 60/204,499 filed May 16, 2000.

TECHNICAL FIELD

The present invention relates to aircraft control systems. In particular, the present invention to relates to a nacelle control system in a tiltrotor aircraft.

DESCRIPTION OF THE PRIOR ART

Flying a tiltrotor aircraft is a complicated and demanding task. The pilot must be aware of many things going on at once. In particular, the pilot must be aware of the ever-changing operating conditions of the aircraft and all of its systems. To do this, the pilot must scan multiple control panels and gauges to determine the operating condition of the many systems of the aircraft. Failure by the pilot to carefully monitor these systems can lead to serious problems. Because flying a tiltrotor aircraft is such a demanding task, designers are constantly considering ways to reduce pilot workload.

Although there have been great strides in tiltrotor aircraft technology, many shortcomings remain. Conventional tiltrotor aircraft have the following shortcomings: (1) it is possible for an inattentive pilot to operate the tiltrotor aircraft outside its nacelle angle-speed flight envelope; (2) there is no automated nacelle control, or means for switching between manual and automated control modes; (3) there are no preprogrammed nacelle angle indicators in the flight control computers; (4) fault detection for electrical failures and back-up switching for mechanical faults are inadequate; and (5) there is no automatic engagement of a maintenance mode.

In addition, as tiltrotor aircraft become more widely available for civil use, it is likely that certain operational guidelines and regulations will be implemented. Such operational guidelines and regulations may include certain standards and procedures, such as terminal area procedures for tiltrotor aircraft. No efforts have been made to mechanize the control of tiltrotor nacelles in anticipation of such standards and procedures be implemented.

SUMMARY OF THE INVENTION

There is a need for a multi-mode tiltrotor nacelle control system with integrated envelope protection.

Therefore, it is an object of the present invention to provide a multi-mode tiltrotor nacelle control system with integrated envelope protection.

The above objects are achieved by providing a multi-mode tiltrotor nacelle control system with integrated envelope protection having three modes of operation: an automatic mode, a semi-automatic mode, and a maintenance mode. The nacelle control system of the present invention includes a power lever thumbwheel with which the pilot can switch between the various modes of operation. There is triple redundancy in the nacelle control system in that switches are disposed on the pilot's power lever, the co-pilot's power lever, and the flight control panel.

The present invention reduces pilot workload associated with the fourth primary control for tiltrotor aircraft, i.e. nacelle rotation, by providing semi-automatic nacelle control and automatic mode switching. With the present invention, flight safety is improved by protecting the pilot from operating the aircraft outside its nacelle angle-speed flight envelope. In addition, the present invention improves pilot situational awareness by providing pre-programmed nacelle angle detents and cockpit indications consistent with the nacelle rate inhibit logic in the FCC's. Also, the present invention improves the reliability of nacelle conversion systems by utilizing redundant, simple switches, providing in-line fault detection for electrical failures, and providing back-up switches to protect against mechanical faults. Furthermore, the present invention improves the safety of maintenance operation by automatically engaging a maintenance mode that utilizes slower nacelle rotation rates.

The present invention provides the following advantages: (1) high reliability for a tiltrotor nacelle conversion system; (2) mitigation of safety hazards associated with tiltrotor flight envelope exceedance; (3) reduction in flight crew workload to permit single pilot tiltrotor operations; (4) easy pilot access to maximum conversion rate for a power-off, e.g. dual engine failure, re-conversion maneuver; and (5) a mechanized means for complying with anticipated standards and procedures for the control of tiltrotor aircraft.

The above objects and advantages, as well as others, will be evident from the following detailed description of the present invention.

BRIEF DESCRIPTION OF THE DRAWINGS

FIG. 7 is a tabular representation of typical inputs for the nacelle control functions of the control law for the multi-mode tiltrotor nacelle control system with integrated envelope protection of the present invention.

FIG. 8 is a tabular representation of typical outputs for the nacelle control functions of the control law for the multi-mode tiltrotor nacelle control system with integrated envelope protection of the present invention.

DESCRIPTION OF THE PREFERRED EMBODIMENT

Figure 1:
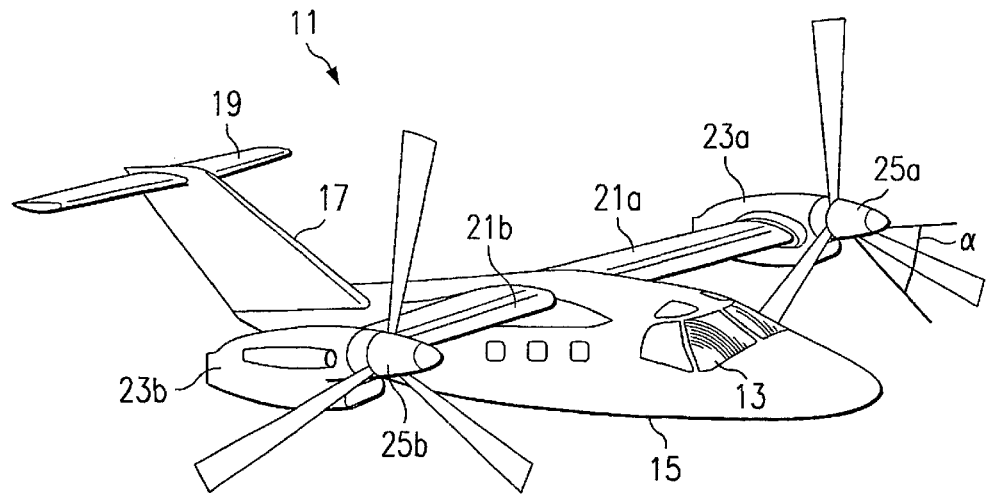
FIG. 1 is a perspective view of a tilt rotor aircraft having a multi-mode tiltrotor nacelle control system with integrated envelope protection according to the present invention.

Referring to FIG. 1 in the drawings, a tilt rotor aircraft 11 having a multi-mode tiltrotor nacelle control system with integrated envelope protection 13 according to the present invention is illustrated. Tilt rotor aircraft 11 comprises the following airframe components: a fuselage 15, a tail section 17 coupled to the aft portion of fuselage 15, a horizontal stabilizer 19 carried by tail section 17, a left wing member 21a coupled to fuselage 15, a right wing member 21b coupled to fuselage 15, a left engine nacelle 23a pivotally coupled to left wing member 21a, a right engine nacelle 23b pivotally coupled to right wing member 21b, a left engine and proprotor gear box (not shown) carried by left engine nacelle 23a, a right engine and proprotor gear box (not shown) carried by right engine nacelle 23b, a left proprotor 25a coupled to left engine and proprotor gear box, and a right proprotor 25b coupled to right engine and proprotor gear box. The combination of each engine nacelle, engine, proprotor gear box, proprotor, and other power transmission components operably associated with nacelles 23a and 23b, are also referred to herein as the "tiltrotor assembly." Tilt rotor aircraft 11 can operate in either an airplane mode, in which aircraft 11 flies like a fixed wing aircraft, or in a helicopter mode, in which aircraft 11 can take off, fly, land, and hover like a helicopter or other rotary wing aircraft. In FIG. 1, tilt rotor aircraft 11 is shown in the airplane mode.

Figure 2:
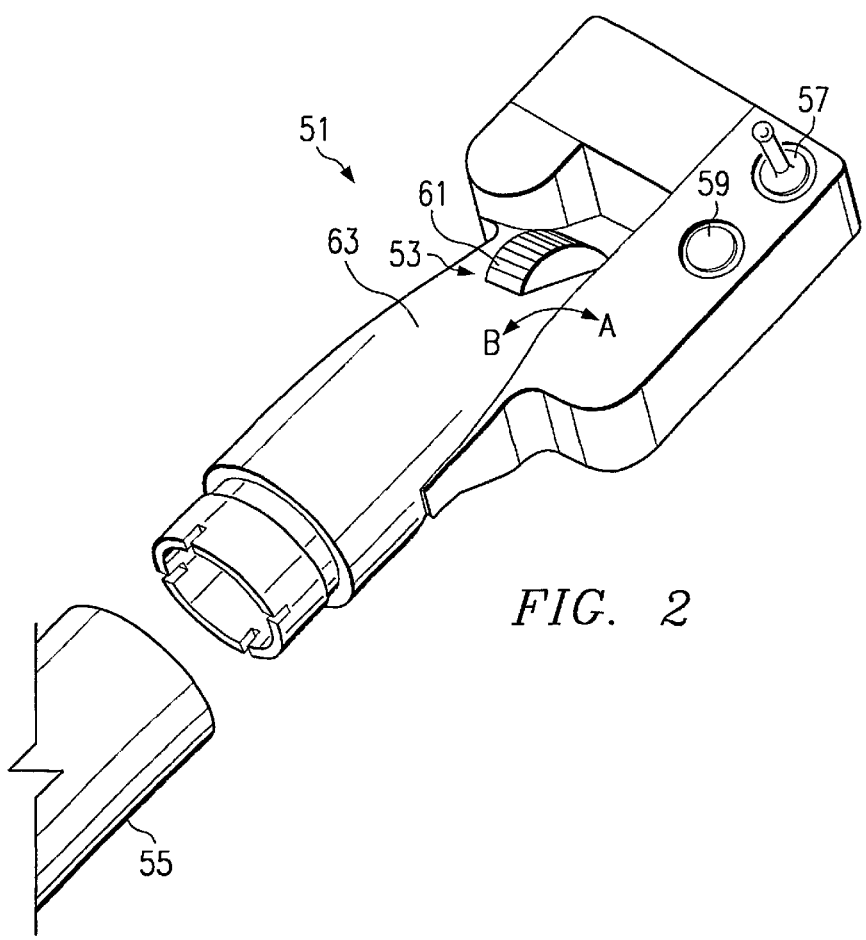
FIG. 2 is a perspective view of power lever grip with nacelle control thumbwheel for the multi-mode tiltrotor nacelle control system with integrated envelope protection of the present invention.

Referring now to FIG. 2 in the drawings, a power lever grip 51 with nacelle control thumbwheel 53 according to the present invention is illustrated. Thumbwheel 53 preferably has a knurled edge 61 that protrudes above a grip surface 63. Thumbwheel 53 is spring biased in a selected position, but may be rotated by the pilot in a forward direction indicated of arrow A, or in an aft direction indicated by arrow B. Tiltrotor aircraft 11 includes at least two such power lever grips 51: one coupled to a pilot's power lever 55, and another coupled to the co-pilot's power lever (not shown, but similar to pilot's power lever 55). Power levers 55 are analogous to the collective in helicopters and the throttle in fixed wing aircraft. Power lever grip 51 may include switches 57, buttons 59, and other control mechanisms for controlling various aircraft functions and maneuvers. It should be understood that power lever grip 51 may be integral with power lever 55. In addition, it should be understood that thumbwheel 53 may have different configurations, such as a sliding knob, a joystick, or any other suitable electronic input device.

Figure 3:
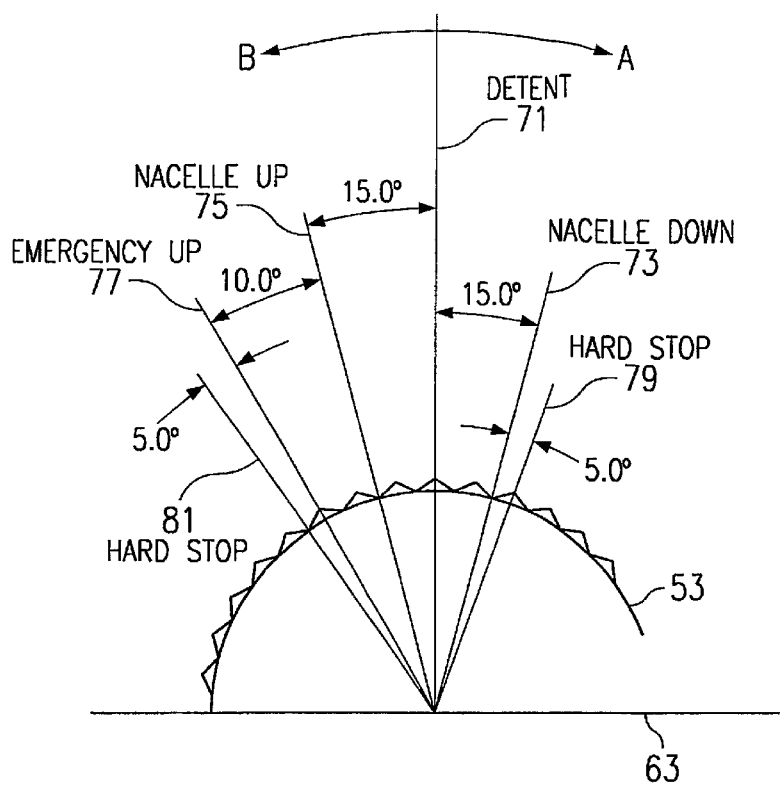
FIG. 3 is a schematic of the thumbwheel switch for the multi-mode tiltrotor nacelle control system with integrated envelope protection of the present invention.

Referring now to FIG. 3 in the drawings, a schematic of thumbwheel 53 is illustrated. Thumbwheel 53 is preferably spring loaded by a conventional spring mechanism (not shown) to provide at least four detent positions: a first detent 71, a second detent 73, a third detent 75, and a fourth detent 77. In addition, thumbwheel 53 has a forward hardstop position 79 and an aft hardstop position 81. Thumbwheel 53 is prevented from rotating in the forward direction beyond forward hardstop 79, and is prevented from rotating in the aft direction beyond aft hardstop 81. First detent 71, also referred to as "nacelle control off detent," is the default detent and is positioned about 90° up from grip surface 63 of power lever grip 51. First detent 71 is the default detent because thumbwheel 53 is spring biased to return to first detent 71 when released by the pilot. Second detent 73, also referred to as the "nacelle down detent," is positioned about 15° forward from first detent 71. Forward hardstop is positioned about 5° forward from second detent 73. Third detent 75, also referred to as "nacelle up detent," is positioned about 15° aft from first detent 71. Fourth detent 77, also referred to as "emergency up detent," is positioned about 10° aft from third detent 75. Aft hardstop 81 is positioned about 5° aft from fourth detent 77. Thus, the total rotation of thumbwheel 53 from forward hardstop 79 to aft hardstop 81 is about 50°.

Nacelle control system 13 has three modes of operation: (1) a semi-automatic nacelle control mode; (2) a fixed rate command mode; and (3) a maintenance control mode. Automatic mode switching is provided via a Flight Control Computer (FCC) algorithm 301 (see FIG. 6) to switch among the three modes of operation. In all three modes of operation, thumbwheel 53 returns to first detent 71 when released by the pilot.

In the semi-automatic nacelle control mode, thumbwheel 53 allows the pilot to command nacelles 23a and 23b (see FIG. 1) to rotate to fixed, pre-defined nacelle reference angles of 75°, 60°, and 0°, as measured up from full airplane mode. In the semi-automatic nacelle control mode, if thumbwheel 53 is held at, or approaches second detent 73, then nacelles 23a and 23b rotate forward to the next available nacelle reference angle; and if thumbwheel 53 is held at, or approaches, third detent 75, then nacelles 23a and 23b rotate aft to the next available nacelle reference angle. In the semi-automatic nacelle control mode, if thumbwheel 53 is held at, or approaches fourth detent 77, then nacelles 23a and 23b rotate aft to the full aft angle of 95°.

The fixed rate command mode is automatically engaged when nacelle angle $\alpha$ is sensed to be in helicopter mode range. When in the fixed rate command mode, downward nacelle rotation occurs at a fixed rate when thumbwheel 53 is held at, or approaches, second detent 73, and upward nacelle rotation occurs at a fixed rate when thumbwheel 53 is held at, or approaches, third detent 73.

The maintenance mode is automatically engaged when FCC's detect that aircraft 11 is in a maintenance condition, which is determined by reading triply redundant weight-on-wheels switches (not shown) on each of three landing gear (not shown), and by monitoring the proprotor speed from triplex tachometers (not shown) located in the left and right proprotor gear boxes. When in maintenance mode, downward nacelle rotation occurs at a fixed, slow rate when thumbwheel 53 is held at, or approaches, second detent 73, and upward nacelle rotation occurs at a fixed, slow rate when thumbwheel 53 is held at, or approaches, third detent 73. It should be understood that any number of detents may be utilized on thumbwheel 53 to provide movement of nacelles 23a and 23b in various directions or to various pre-selected positions.

Figure 4:
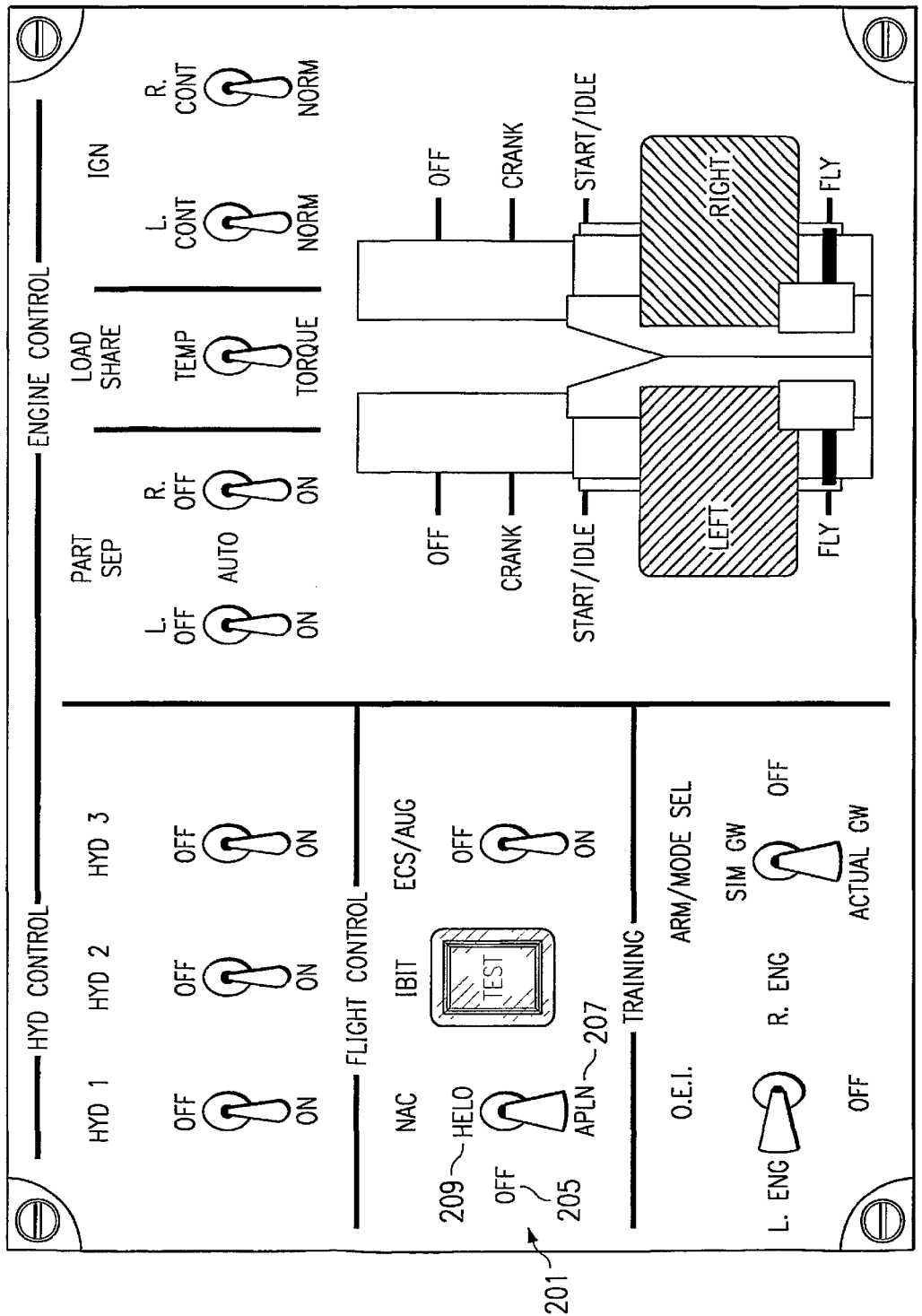
FIG. 4 is a schematic of the flight control panel with backup nacelle control switch for the multi-mode tiltrotor nacelle control system with integrated envelope protection of the present invention.

Referring now to FIG. 4 in the drawings, there are three redundant sources in the cockpit of aircraft 11 for activating nacelle control system 13: (1) pilot power lever thumbwheel 53; (2) copilot power lever thumbwheel (not shown); and (3) a backup switch 201 disposed on a flight control panel 203 disposed in an overhead console (not shown). Backup switch 201 includes an "OFF" position 205, an "APLN" position 207, and a "HELO" position 209. When backup switch 201 is in the "OFF" position, no rotation of nacelles 23a and 23b is commanded. When backup switch 201 is moved into the "HELO" position, nacelles 23a and 23b rotate aft to the next nacelle reference angle. When backup switch 201 is moved into the "APLN" position, nacelles 23a and 23b rotate forward to the next nacelle reference angle. It should be understood that the indicia "OFF," "HELO," and "APLN" may be interchanged with any other appropriate visual indicia.

Nacelle control system 13 is a triple redundant system. Thumbwheel 53 on pilot's power lever 55 and the thumbwheel on the co-pilot's power lever provide the first two activation sources of nacelle control system 13. Backup switch 201 provides the third activation source of nacelle control system 13. The redundant sources for activating nacelle control system 13 allow for pilot/copilot crew coordination, allow for single pilot operation, and allow for nacelle control system 13 to be operational in the event of failure of two of the activation sources. The inputs for the three sources are combined in an "OR" logic by the FCC's for all of the sources that are determined to not have failed.

Figure 5:
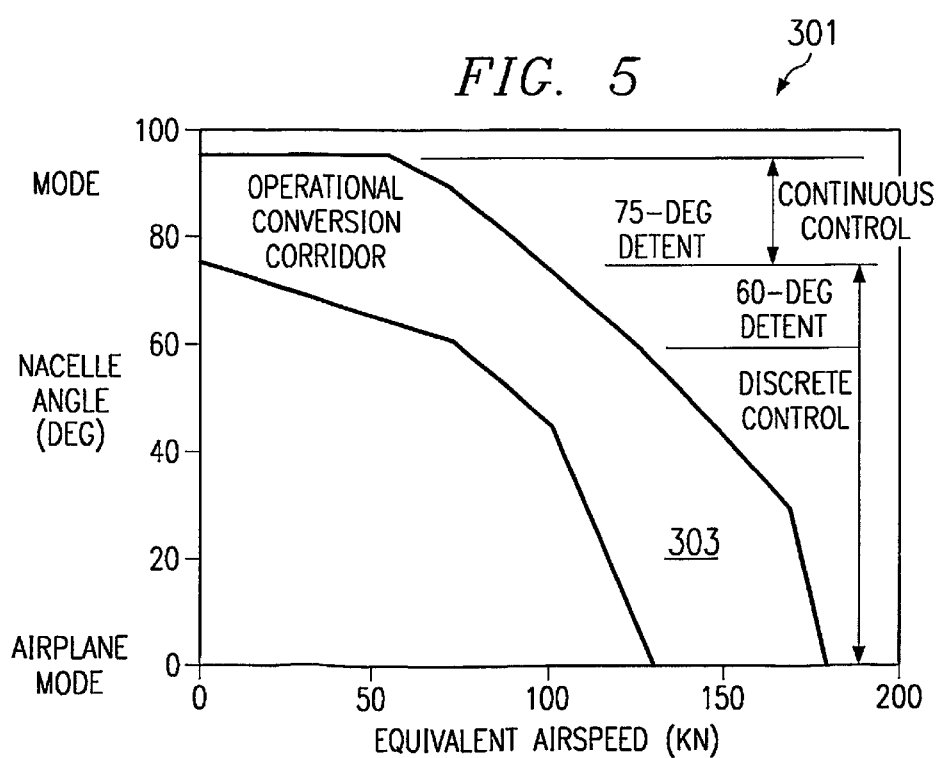
FIG. 5 is schematic of the nacelle conversion envelope protection for the multi-mode tiltrotor nacelle control system with integrated envelope protection of the present invention.

Referring now to FIG. 5 in the drawings, a graph 301 having a horizontal axis which represents equivalent airspeed in knots and a vertical axis which represents nacelle angle in degrees in illustrated. An operational conversion corridor 303 in graph 301 represents the safe operating envelope in which aircraft 11 may be operated. Operational conversion corridor 303 is defined and predetermined in the structural design criteria of aircraft 11. Nacelle control system 13 protects the pilot from operating aircraft 11 outside of operational conversion corridor 303.

According to the preferred embodiment of the present invention, the nacelle rotation rate is automatically slowed down if the airspeed is approaching the upper envelope limit during an aft nacelle rotation, and the nacelle rotation rate is automatically slowed down if the airspeed is approaching the lower envelope limit during a forward nacelle rotation. This feature is disabled by the FCC's if aircraft 11 is detected to be in a power-off re-conversion state. The nacelle rate command is automatically inhibited by the FCC's if aircraft 11 is detected to be at or beyond an airspeed limitation and the nacelle rate command is in the direction to aggravate the envelope violation. The upper and lower airspeed limitations are digitally transmitted from the FCC's to the flight displays to provide cockpit indications consistent with the nacelle rate command limitations.

Figure 6:
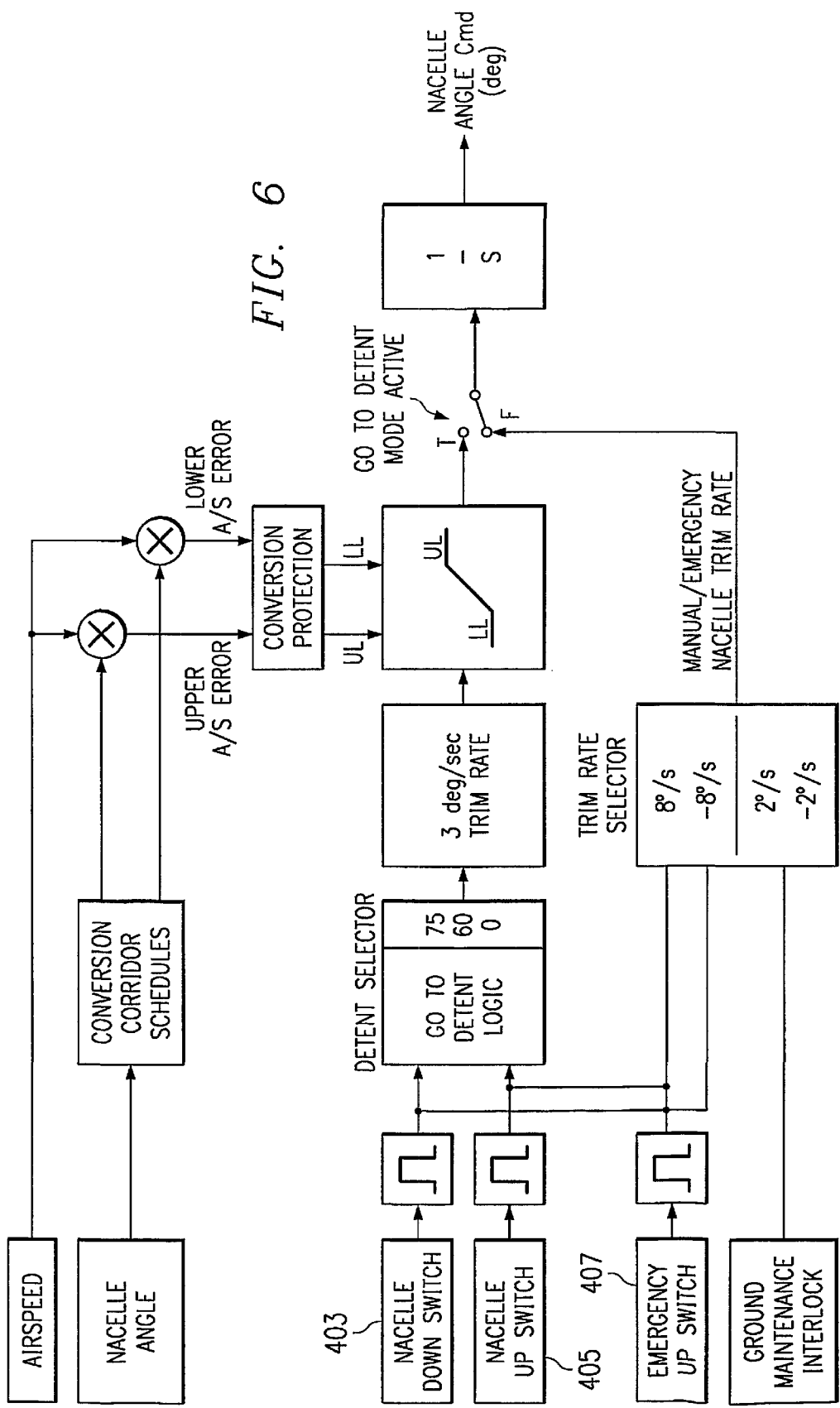
FIG. 6 is a schematic of the control law for the multi-mode tiltrotor nacelle control system with integrated envelope protection of the present invention.

Referring now to FIG. 6 in the drawings, a schematic of the control law 401 for nacelle control system 13 is illustrated. Movements of thumbwheel 53 are detected by a plurality of switches 403, 405, and 407 coupled to thumbwheel 53. Switch 403 is operably associated with second detent 73, switch 405 is operably associated with third detent 75, and switch 407 is operably associated with fourth detent 77. Each switch 403, 405, and 407 has a triply redundant electrical interface to the three FCC's to maintain high system reliability and robustness to electrical faults. Switches 403, 405, and 407 pilot's thumbwheel 53 and the copilot's thumbwheel are arranged in a network that provides a voltage range of at least 1.5 Volts for each of the four detents 71, 73, 75, and 77. This voltage range allows switches 403, 405, and 407 to activate and initiate appropriate nacelle movement when thumbwheel 53 merely approaches detents 73, 75, and 77, respectively. In other words, switches 403, 405, and 407 are not discreet; rather, switches 403, 405, and 407 are activated when thumbwheel 53 has been moved about halfway between the four detent positions 71, 73, 75, and 77. Another advantage of non-discreet, voltage range switches 403, 405, and 407, is that the FCC's can automatically detect electrical open and short failures and provide an appropriate maintenance alert message.

A software algorithm using set/reset latches controls the nacelle detent commands. During nacelle activation, the pilot can reset the detent command at any point within the allowable operational conversion corridor 303 (see FIG. 5) by deflecting the switch in the opposite direction from the nacelle movement.

Nacelle Control Function

A nacelle control function provides continuous control of nacelles 23a and 23b in or near the helicopter mode, i.e., 95° to 75°, at a fixed rate, and the semi-automatic nacelle reference angles of 75°, 60°, and 0° for converting nacelles 23a and 23b at pre-programmed rates from 75° to airplane mode. In the semi-automatic mode, nacelles 23a and 23b stop at each nacelle reference angle and wait for another nacelle switch command to initiate further nacelle motion. Similar detents are pre-programmed for reconverting from the airplane mode, and operate until nacelles 23a and 23b are in the continuous control range around helicopter mode. This control operates such that commanding nacelles 23a and 23b in the direction opposite the current motion in the range between 75° and 0° will stop nacelles 23a and 23b at that point, except when close to a downstop assembly (not shown), when nacelles 23a and 23b will either transition to the downstop assembly or stop at a selected position above the downstop assembly. The downstop assembly comprises a striker and cradle assembly which ensures that nacelles 23a and 23b remain fixed in the airplane mode by maintaining a selected preload on wings 21a and 21b. This feature of a pre-programmed nacelle rate when approaching the airplane mode is compatible with the nacelle downstop assembly. The nacelle control function maintains adequate rotor aeroelastic stability margins at high airspeeds, and limits the force the nacelle actuation system (not shown) exerts against the downstop assembly.

In addition to these normal operating characteristics, the nacelle control function provides a high-speed emergency re-conversion mode which overrides any detents. This function is used in the case of a dual engine failure in airplane mode, in order to minimize the transition time during re-conversion and limit the potential for excessive rotor speed droop.

The nacelle control function includes conversion protection functions that are intended to assist the pilot in keeping aircraft 11 within operational conversion corridor 303 (see FIG. 5). With the loss of airspeed sensing, these conversion protection functions are lost, requiring additional pilot compensation to avoid exceeding the conversion corridor limits. The conversion protection function calculates conversion corridor speed limits as a function of upper and lower nacelle angle $\alpha$ for cockpit displays. In addition, the conversion protection function reduces the pre-programmed nacelle rates as the conversion corridor speed limit is approached, i.e., the upper speed limit while re-converting, or the lower speed limit while converting. Conversion corridor speed limit violation signals are generated and passed to the avionics system to activate cockpit aural tone warnings and warning displays when the upper or lower speed limits have been exceeded.

Nacelle Control Laws (CLN) Description

The nacelle control laws are responsible for commanding nacelle angle to control the conversion actuators. The nacelle control laws include the following modules:

a. CLN01_NACLOGIC—nacelle control logic;
b. CLN02_NACDETENT—nacelle detent and trim rate command;
c. CLN03_NACCMD—nacelle command;
d. CLN04_NACLIM—nacelle command limiting; and
e. CLN05_GOTODET—nacelle go to detent logic.

The following is a description of each of the above modules:

CLN01_NACLOGIC—Nacelle Control Logic

The nacelle control logic module controls the moding between the semi-automatic nacelle control conditions: emergency re-conversion, go-to detent forward, and go-to detent aft. Semi-automatic nacelle control is provided to reduce pilot workload and standardize nacelle operation. The control law processing for the nacelle go-to detent modes is divided between CLN01 and CLN05 modules. CLN01 enables the modes and CLN05 sets the go-to detent command. The moding logic in CLN01 is based on the selected discrete input from thumbwheel 53, the aircraft flight condition, and the nacelle angle command setting. The go-to detent modes are disabled when the control laws detect that nacelles 23a and 23b have arrived at the next nacelle reference angle. In response to pilot command, emergency re-conversion mode is latched, provided airspeed is less than 180 knots, to minimize pilot workload during an emergency power-off re-conversion. The condition of the emergency re-conversion set/reset latch is initialized based on cross-channel data to avoid force fight conditions in the conversion actuators.

CLN02_NACDETENT—Nacelle Detent and Trim Rate Command

The nacelle detent and trim rate command module computes the detent and trim rate values that are used by the nacelle command modules. The detent setting is determined by comparing the pre-programmed nacelle reference angles of 0°, 60°, and 75°, with the current nacelle angle command value and by looking at the direction of the nacelle rate command. The nacelle angle command value is used in lieu of the sensed nacelle angle to prevent overshoots caused by system tolerances. A tolerance value of about 0.16° is added to the comparator threshold to prevent timing discrepancies from adversely affecting the nacelle reference angle computation. In addition, module CLN02 performs logic processing for the HPDU Unlock Discrete that is used by Redundancy Management to control the conversion actuators. The HPDU Unlock Discrete is set when nacelles 23a and 23b are commanded off-the-downstop, and it is reset when the nacelle angle command reaches about 5°.

When nacelles 23a and 23b are aft of 75°, nacelle control is based on a fixed-rate control law which command +/−8° per second nacelle rate based on the selected nacelle controller discrete input. A constant nacelle rate of 3° per second is used as nacelles 23a and 23b are commanded between detents for nacelle angles a less than 75°. The rate is set at +/−2 degrees per second when aircraft 11 is determined to be in the maintenance mode.

CLN03_NACCMD—Nacelle Command

The nacelle command module produces an integrated nacelle angle command that drives the conversion actuator servo-loops. The nacelle angle command switches between the nacelle trim rate command or the nacelle reference angle command based upon mode logic. The nacelle angle command integrator is initialized based on cross channel data. In addition, a discrete is computed that indicates when the nacelle angle command as arrived at its detent setting. This discrete is used to create a crew alert to indicate that the aircraft is operating at a non-reference nacelle angle.

CLN04_NACLIM—Nacelle Command Limiting

The nacelle command limiting module provides a conversion protection function. The selected control law airspeed is compared against operational conversion corridor 303 boundaries to determine rate limits on the nacelle angle command. If the aircraft is approaching the upper speed boundary, limits are placed on aft nacelle rate. Similarly, if the aircraft is approaching the lower speed boundary, limits are placed on forward nacelle rate. The limits prevent the nacelle angle command from causing aircraft 11 to exceed the speed operating limits.

CLN05_GOTODET—Nacelle Go-To Detent Logic

The nacelle go-to detent logic module applies inhibits to the pilot's capability to stop nacelle angle α between nacelle reference angles. For nacelle angles between about 20° and 75°, the nacelle angle rate command stops if the control laws receive an input from thumbwheel 53 in the opposite direction of the nacelle motion. When the nacelle angle α is within about 20° of the downstop, nacelles command will not hold its current value in response to a pilot stop command. Instead, the nacelles will be commanded to either 20° or 0° depending on the direction of the stop command.

Typical inputs for the nacelle control laws are set forth in table 501 of FIG. 7, and typical outputs for the nacelle control laws are set forth in table 601 of FIG. 8.

FCC Requirements for Nacelle Control Functions

The following are preferred FCC requirements for the nacelle control functions of nacelle control system 13.

The nacelle angle control provides positive crew control of nacelle angle α and provides continuous control in or near helicopter mode, i.e. 95° to 75°, at a fixed rate. The capability to command conversion rates of ±8° per second for any nacelle position between 75° and 95° is provided in order to ensure satisfactory performance for one engine inoperative fly-away.

The nacelle manual trim control provides the capability to set any nacelle angle α between 75° and 95° in a smooth and predictable manner. The nacelle rate command smoothly sets to zero upon returning thumbwheel 53 to first detent 71 at any nacelle angle α between 75° and 95°, and the nacelle rate command smoothly sets to zero as nacelles 23a and 23b reach the up-stop at the nacelle angle α of 95°.

The nacelle angle control provides semi-automatic reference nacelle angles of 75°, 60°, −2° for converting at pre-programmed fixed rates. The fixed rate nacelle command to the nacelle actuators is initiated in a smooth manner. The nacelle angle control smoothly commands nacelles 23a and 23b such that nacelles 23a and 23b stop at nacelle reference angle and wait for another nacelle switch command to initiate further nacelle motion. However, the nacelle angle control provides a high-speed, preferably 8° per second, emergency re-convert mode that over-rides the nacelle reference angles. An emergency re-convert function only requires a single action of the discrete emergency re-convert switch signal to command nacelles 23a and 23b all the way to a nacelle angle α of 95° unless inhibited by conversion protection.

The nacelle angle control is such that commanding nacelles 23a and 23b in the direction opposite to current motion during any semi-automatic mode, including emergency re-convert, between nacelle angles α of 20° and 75° stops nacelles 23a and 23b at that point; and is such that commanding nacelles 23a and 23b in the direction opposite to current motion between the downstop and 20° moves nacelles 23a and 23b automatically to the downstop or 20° according to the direction of the command from thumbwheel 53.

Moving backup switch 201 (see FIG. 4) to the "OFF" position disables the control law logic that prevents the pilot from stopping nacelles 23a and 23b within 20° of the downstop. The nacelle angle control changes the command nacelle angle at a nacelle rate schedule selected to give satisfactory handling qualities for conversion and re-conversion.

The nacelle angle control limits nacelle angle α to greater than about 60° when aircraft 11 is on the ground and prop rotors 25a and 25b are turning. The nacelle angle control provides bang-bang nacelle rate control at 2° per second when aircraft 11 is on the ground and prop rotors 25a and 25b are not turning, or when the RPM is low. During conversion to the downstop, the rate of change of the nacelle position command is reduced to 1° per second within 2° of the downstop. The nacelle angle control holds the commanded nacelle angle if RPM is at the airplane mode setting and the command has not been initiated to change RPM to helicopter mode setting.

The nacelle angle control initializes the commanded nacelle angle to the average sensed nacelle angle upon receipt of a discrete nacelle angle command signal from redundancy management processing. The nacelle angle control holds the commanded nacelle angle upon receipt of a discrete nacelle angle command "HOLD" signal from redundancy management processing. The nacelle angle control initializes the GO-TO-DETENT set/reset latches based on cross channel data if the cross channel data is valid.

A discrete HPDU Unlock signal is set HIGH when nacelles 23a and 23b have been commanded off the downstop and the RPM is at the helicopter mode setting. The HPDU Unlock signal is reset when nacelles 23a and 23b are sufficiently off the downstop or a go-forward nacelle input is commanded. The nacelle angle control commands the nacelle servo-loop to 2 milliamps immediately following release of the downstop brakes. The nacelle angle control should computes discrete inputs to indicate when the nacelles are transitioning forward or aft, or are at a nacelle reference angle. The nacelle angle control computes a discrete signal to indicate when nacelles 23a and 23b have been stopped at a non-reference angle position.

The present invention provides the following advantages over the prior art: (1) high reliability for a tiltrotor nacelle conversion system; (2) mitigation of safety hazards associated with tiltrotor flight envelope exceedance; (3) reduction in flight crew workload to permit single pilot tiltrotor operations; (4) easy pilot access to maximum conversion rate for a power-off, e.g. dual engine failure, re-conversion maneuver; and (5) a mechanized means for complying with anticipated standards and procedures for the control of tiltrotor aircraft.

Although the present invention is shown in a limited number of forms, it is not limited to just these forms, but is amenable to various changes and modifications without departing from the spirit thereof.

What is claimed is:

1. A tiltrotor aircraft comprising:
    a fuselage;
    at least one wing member coupled to the fuselage;
    a tiltrotor assembly pivotally coupled to the at least one wing member;
    at least one flight control computer;
    a power lever for controlling the operations of the tiltrotor aircraft, the power lever being electrically coupled to the at least one flight control computer; and
    a nacelle control system electrically coupled to the at least one flight control computer for controlling the rotational movement of the tiltrotor assembly;
    wherein activation of the nacelle control system causes pre-selected rotational movement of the tiltrotor assembly.

2. The tiltrotor aircraft according to claim 1, wherein the nacelle control system comprises:
    a thumbwheel electrically coupled to the power lever and the at least one flight control computer;
    wherein rotational movement of the thumbwheel causes the pre-selected rotational movement of the tiltrotor assembly.

3. The tiltrotor aircraft according to claim 2, wherein the thumbwheel comprises:
    a plurality of detent positions;
    wherein rotation of the thumbwheel to each detent position causes a selected rotational movement of the tiltrotor assembly.

4. The tiltrotor aircraft according to claim 2, wherein the thumbwheel comprises:
    a first detent position into which the thumbwheel is spring biased;
    a second detent position;
    a third detent position; and
    a fourth detent position;
    wherein the tiltrotor assembly rotates in a forward direction when the thumbwheel is rotated into the second detent position;
    wherein the tiltrotor assembly rotates in an aft direction when the thumbwheel is rotated into the third detent position;
    wherein the tiltrotor assembly does not rotate when the thumbwheel is in the first detent position, and the tiltrotor assembly stops rotating when the thumbwheel springs back into the first detent position from either the second detent position or the third detent position; and
    wherein the tiltrotor assembly continuously rotates in an aft direction until the tiltrotor aircraft is in a full helicopter mode when the thumbwheel is rotated into the fourth detent position.

5. The tiltrotor aircraft according to claim 2, wherein the thumbwheel comprises:
    a plurality of detent positions, each detent position corresponding to a selected rotational movement of the tiltrotor assembly; and
    a voltage range switch operably associated with each detent position;
    wherein rotation of the thumbwheel into a selected proximity of any detent position causes the selected rotational movement of the tiltrotor assembly corresponding to that detent position.

6. The tiltrotor aircraft according to claim 2, further comprising:
    a second power lever for controlling the operations of the tiltrotor aircraft, the second power lever being electrically coupled to the at least one flight control computer; and
    an activation switch disposed on a flight control panel within the tiltrotor aircraft;
    wherein the nacelle control system may be activated from the power lever, the second power lever, or the activation switch, thereby providing triple redundancy for the activation of the nacelle control system.

7. The tiltrotor aircraft according to claim 1, further comprising:
    a power lever grip coupled to the power lever; and
    a thumbwheel electrically coupled to the power lever grip and the at least one flight control computer;
    wherein rotational movement of the thumbwheel causes the pre-selected rotational movement of the tiltrotor assembly.

8. The tiltrotor aircraft according to claim 7, wherein the thumbwheel comprises:

a plurality of detent positions;

wherein rotation of the thumbwheel to each detent position causes a selected rotational movement of the tiltrotor assembly.

9. The tiltrotor aircraft according to claim 7, wherein the thumbwheel comprises:

a first detent position into which the thumbwheel is spring biased;

a second detent position;

a third detent position; and a fourth detent position;

wherein the tiltrotor assembly rotates in a forward direction when the thumbwheel is rotated into the second detent position;

wherein the tiltrotor assembly rotates in an aft direction when the thumbwheel is rotated into the third detent position;

wherein the tiltrotor assembly does not rotate when the thumbwheel is in the first detent position, and the tiltrotor assembly stops rotating when the thumbwheel springs back into the first detent position from either the second detent position or the third detent position; and wherein the tiltrotor assembly continuously rotates in an aft direction until the tiltrotor aircraft is in a full helicopter mode when the thumbwheel is rotated into the fourth detent position.

10. The tiltrotor aircraft according to claim 7, wherein the thumbwheel comprises:

a plurality of detent positions, each detent position corresponding to a selected rotational movement of the tiltrotor assembly; and a voltage range switch operably associated with each detent position;

wherein rotation of the thumbwheel into a selected proximity of any detent position causes the selected rotational movement of the tiltrotor assembly corresponding to that detent position.

11. The tiltrotor aircraft according to claim 7, further comprising:

a second power lever for controlling the operations of the tiltrotor aircraft, the second power lever being electrically coupled to the at least one flight control computer;

a second power lever grip coupled to the second power lever;

a second thumbwheel electrically coupled to the second power lever grip and the at least one flight control computer; and an activation switch disposed on a flight control panel within the tiltrotor aircraft;

wherein the nacelle control system may be activated from the thumbwheel, the second thumbwheel, or the activation switch, thereby providing triple redundancy for the activation of the nacelle control system.

12. The tiltrotor aircraft according to claim 11, wherein each thumbwheel comprises:

a first detent position into which the thumbwheel is spring biased;

a second detent position;

a third detent position; and a fourth detent position;

wherein the tiltrotor assembly rotates in a forward direction when either thumbwheel is rotated into the second detent position;

wherein the tiltrotor assembly rotates in an aft direction when either thumbwheel is rotated into the third detent position;

wherein the tiltrotor assembly does not rotate when either thumbwheel is in the first detent position, and the tiltrotor assembly stops rotating when either thumbwheel springs back into the first detent position from either the second detent position or the third detent position;

wherein the tiltrotor assembly continuously rotates in an aft direction until either tiltrotor aircraft is in a full helicopter mode when either thumbwheel is rotated into the fourth detent position; and wherein the at least one flight control computer is programmed to resolve any conflicts between the two power levers and the two thumbwheels.

13. The tiltrotor aircraft according to claim 11, wherein each thumbwheel comprises:

a plurality of detent positions, each detent position corresponding to a selected rotational movement of the tiltrotor assembly; and a voltage range switch operably associated with each detent position;

wherein rotation of either thumbwheel into a selected proximity of any detent position causes the selected rotational movement of the tiltrotor assembly corresponding to that detent position.

14. The tiltrotor aircraft according to claim 1, wherein the at least one flight control computer is programmed to prevent the tiltrotor assembly from rotating into a position outside a selected operating envelope as determined by the operating conditions of the tiltrotor aircraft.

15. The tiltrotor aircraft according to claim 1, further comprising:

a plurality of pre-selected nacelle reference angles;

wherein the activation of the nacelle control system causes rotation of the tiltrotor assembly into one of the pre-selected nacelle reference angles.

16. The tiltrotor aircraft according to claim 15, wherein the pre-selected nacelle reference angles are about 0°, 60°, 75°, and 95° the pre-selected nacelle reference angles being the angle between a longitudinal axis of the tiltrotor assembly and the at least one wing member.

17. The tiltrotor aircraft according to claim 1, wherein the nacelle control system comprises:

a semi-automatic mode in which activation of the nacelle control system causes rotation of the tiltrotor assembly into pre-selected nacelle reference angles;

a fixed rate command mode in which the tiltrotor assembly is in a helicopter mode; and a maintenance mode which is automatically engaged when the at least one flight control computer detects that the tiltrotor aircraft is in a maintenance condition.

18. A method controlling the rotation of a tiltrotor assembly in a tiltrotor aircraft, the method comprising the steps of:

providing a flight control computer for controlling the operations of the tiltrotor aircraft;

electrically coupling a power lever to the flight control computer;

electrically coupling an electronic input device to the power lever;

disposing a plurality of detent positions on the electronic input device;

electrically coupling a voltage range switch to each detent position; and rotating the tiltrotor assembly by activating the electronic input device.

19. The method according to claim 18, further comprising the steps of:

spring biasing the electronic input device into a first detent position; and rotating the tiltrotor assembly to pre-selected positions in response to selected inputs from the electronic input device.

20. The method according to claim 18, further comprising the step of:

programming the flight control computer to prevent the tiltrotor assembly from rotating into a position outside a selected operating envelope as determined by the operating conditions of the tiltrotor aircraft.

* * * * *